(12) United States Patent
Gharpure et al.

(10) Patent No.: US 11,801,465 B2
(45) Date of Patent: Oct. 31, 2023

(54) FILTER ARRANGEMENT FOR A SELECTIVE CATALYTIC REDUCTION SYSTEM

(71) Applicant: Perkins Engines Company Limited, Peterborough (GB)

(72) Inventors: Siddharth Gharpure, Peterborough (GB); Guy Williamson, Grantham (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/899,969

(22) Filed: Aug. 31, 2022

(65) Prior Publication Data

US 2023/0060731 A1    Mar. 2, 2023

(30) Foreign Application Priority Data

Aug. 31, 2021 (GB) .................................... 2112379

(51) Int. Cl.
*B01D 35/027* (2006.01)
*B01D 35/26* (2006.01)
(Continued)

(52) U.S. Cl.
CPC ........... *B01D 35/027* (2013.01); *B01D 35/26* (2013.01); *B01D 35/306* (2013.01);
(Continued)

(58) Field of Classification Search
CPC combination set(s) only.
See application file for complete search history.

(56) References Cited

U.S. PATENT DOCUMENTS 9,248,390 B2    2/2016 Hudgens et al.
9,376,950 B2    6/2016 Ogawa et al.
(Continued)

FOREIGN PATENT DOCUMENTS

CN        105909351 A      8/2016
EP          2723998          4/2014
(Continued)

OTHER PUBLICATIONS

Great Britain Search Report related to Application No. 2112379.9; dated Jan. 26, 2022.
(Continued)

*Primary Examiner* — Binh Q Tran (57) ABSTRACT

The present disclosure is directed towards a filter arrangement for a reductant supply system of a selective catalytic reduction system. The reductant supply system comprises a tank and a suction tube mounted at least partially in the tank for receiving reductant liquid from the tank. The filter arrangement comprises a restraining body, a filter at least partially forming a filter chamber, a filter outlet from the filter chamber formed through the restraining body and/or filter and a filter mount mounted to the restraining body and/or filter. The restraining body extends radially outwardly from the filter mount and is configured to restrain the filter such that, under the effect of buoyancy in the tank in use, gas in the filter chamber is directed towards the filter outlet.

15 Claims, 5 Drawing Sheets

(51) Int. Cl.
*B01D 35/30* (2006.01)
*B01D 53/94* (2006.01)
*F01N 3/20* (2006.01)
*F01N 3/029* (2006.01)

(52) U.S. Cl.
CPC ....... *B01D 53/9418* (2013.01); *F01N 3/2066* (2013.01); *F01N 3/029* (2013.01); *F01N 3/0293* (2013.01); *F01N 3/206* (2013.01); *F01N 3/208* (2013.01); *F01N 2610/02* (2013.01); *F01N 2610/14* (2013.01); *F01N 2610/142* (2013.01); *F01N 2610/1406* (2013.01); *F01N 2610/1426* (2013.01); *F01N 2610/1466* (2013.01); *F01N 2900/04* (2013.01); *F01N 2900/1411* (2013.01); *F01N 2900/1806* (2013.01); *F01N 2900/1814* (2013.01)

(56) References Cited

U.S. PATENT DOCUMENTS

| | | | |
|---|---|---|---|
| 9,377,441 | B2 | 6/2016 | Reimer et al. |
| 10,371,030 | B2 | 8/2019 | Kruse et al. |
| 2009/0294343 | A1 | 12/2009 | Pekarsky et al. |
| 2011/0138790 | A1* | 6/2011 | Radillo ................ F01N 3/2066 60/303 |
| 2011/0232271 | A1* | 9/2011 | Haeberer ............... B60K 15/03 60/301 |
| 2013/0000760 | A1* | 1/2013 | Crary ................... F01N 3/2066 137/565.17 |
| 2014/0260206 | A1* | 9/2014 | Myer ....................... F01N 3/08 96/219 |
| 2015/0202553 | A1* | 7/2015 | Sann .................... B01D 35/027 210/416.1 |
| 2015/0218990 | A1* | 8/2015 | Hudgens ............... F01N 3/2066 422/111 |
| 2015/0367264 | A1* | 12/2015 | Treudt .................. B01D 35/18 210/184 |
| 2017/0189837 | A1* | 7/2017 | Herold ................. B01D 29/605 |
| 2020/0206663 | A1* | 7/2020 | Arias Arias ............ F02M 37/50 |

FOREIGN PATENT DOCUMENTS

| | | |
|---|---|---|
| FR | 2937877 A1 | 5/2010 |
| WO | 2012153202 A1 | 11/2012 |
| WO | 2013079449 | 6/2013 |
| WO | 2020028306 A1 | 2/2020 |
| WO | 2020169426 A1 | 8/2020 |

OTHER PUBLICATIONS

European Extended Search Report for European Patent Appln. No. 22186874.8, dated Feb. 3, 2023 (8 pgs).

* cited by examiner

FILTER ARRANGEMENT FOR A SELECTIVE CATALYTIC REDUCTION SYSTEM

CROSS-REFERENCE TO RELATED APPLICATIONS

This application claims priority under 35 USC § 119 and the Paris Convention to Great Britain Patent Application 2112379.9 filed on Aug. 31, 2021.

TECHNICAL FIELD

This disclosure is directed towards a filter arrangement for a reductant supply system of a selective catalytic reduction system, a reductant supply system and an engine system comprising a selective catalytic reduction system.

BACKGROUND

Engine systems for vehicles and the like may comprise an aftertreatment module for removing unwanted gaseous emissions or pollutants from the exhaust gases of an internal combustion engine. A selective catalytic reduction (SCR) system may be provided in the exhaust gas stream for removing nitrogen oxides (NOx). An SCR system may comprise a reductant injector located upstream of a catalyst and the reductant injector may inject a liquid reductant into the exhaust gases before they contact the catalyst. Suitable liquid reductants may include anhydrous ammonia, aqueous ammonia and urea. The high temperature of the exhaust gases may evaporate the liquid reductant and upon contact with the catalyst, the gaseous reductant may react with the NOx in the exhaust gas to form nitrogen and water.

The SCR system may comprise a pump for directing reductant from a reductant reservoir to the reductant injector. A suction tube may extend into the reductant reservoir to a flexible filter located at the end of the suction tube. During a purge process the pump may draw reductant from the injector back into the reservoir to prevent damage by freezing. However, in doing so, any air in the filter may also be drawn back into the reservoir and into the filter. At the start of the next operation cycle a priming process may run in which reductant is drawn from the reservoir through the filter and suction tube to the injector. However, the pump may draw the air from the filter back into the pump such that priming fails. Alternatively, the air may be released from the filter through the suction tube slowly during operation due to vibration or sloshing in the reservoir. The resulting air bubbles can cause pump pressure to drop due to aeration therein.

SUMMARY

The present disclosure provides a filter arrangement for a reductant supply system of a selective catalytic reduction system, the reductant supply system comprising a tank and a suction tube mounted at least partially in the tank for receiving reductant liquid from the tank, wherein the filter arrangement comprises: a restraining body comprising a distal body side; a filter extending at least partially across the distal body side of the restraining body and at least partially forming a filter chamber; a filter outlet from the filter chamber formed through the restraining body and/or filter; and a filter mount mounted to the restraining body and/or filter, wherein the filter mount is for mounting the filter arrangement to the suction tube such that (a) the filter chamber is in fluid communication with the suction tube via the filter outlet and (b) the filter is on the distal body side of the restraining body to the suction tube. The restraining body may extend radially outwardly from the filter mount and may be configured to restrain the filter such that, under the effect of buoyancy in the tank in use, gas in the filter chamber is directed towards the filter outlet.

The present disclosure further provides a reductant supply system for a selective catalytic reduction system, the reductant supply system comprising: a tank for holding reductant liquid; a suction tube mounted at least partially in the tank for receiving reductant liquid from the tank; and a filter arrangement mounted to the suction tube, the filter arrangement comprising: a restraining body comprising a distal body side; a filter extending at least partially across the distal body side of the restraining body and at least partially forming a filter chamber; a filter outlet from the filter chamber formed through the restraining body and/or filter; and a filter mount mounted to the restraining body and/or filter such that (a) the filter chamber is in fluid communication with the suction tube via the filter outlet and (b) the filter is on the distal body side of the restraining body to the suction tube. The restraining body may extend radially outwardly from the filter mount and suction tube and may be configured to restrain the filter such that, under the effect of buoyancy in the tank in use, gas in the filter chamber is directed towards the filter outlet.

The present disclosure further provides an engine system comprising an exhaust aftertreatment module for receiving exhaust gas from an internal combustion engine, the exhaust aftertreatment module comprising a selective catalytic reduction system, the selective catalytic reduction system comprising the aforementioned reductant supply system.

By way of example only, embodiments according to the present disclosure are now described with reference to, and as shown in, the accompanying drawings.

DETAILED DESCRIPTION

The present disclosure is generally directed towards a filter arrangement of a reductant supply system for a selective catalytic reduction system. The filter arrangement comprises a restraining body and a filter mounted to a suction tube in a reductant liquid tank. The restraining body extends radially outwardly from the suction tube and over the filter. The restraining body prevents the filter from, under the effects of buoyancy of gas therein, floating upwardly above a tube inlet of the suction tube and is instead configured to direct the gas towards the tube inlet. As a result, any gas in the filter is removed early in the next operation cycle during a priming process.

Figure 1:
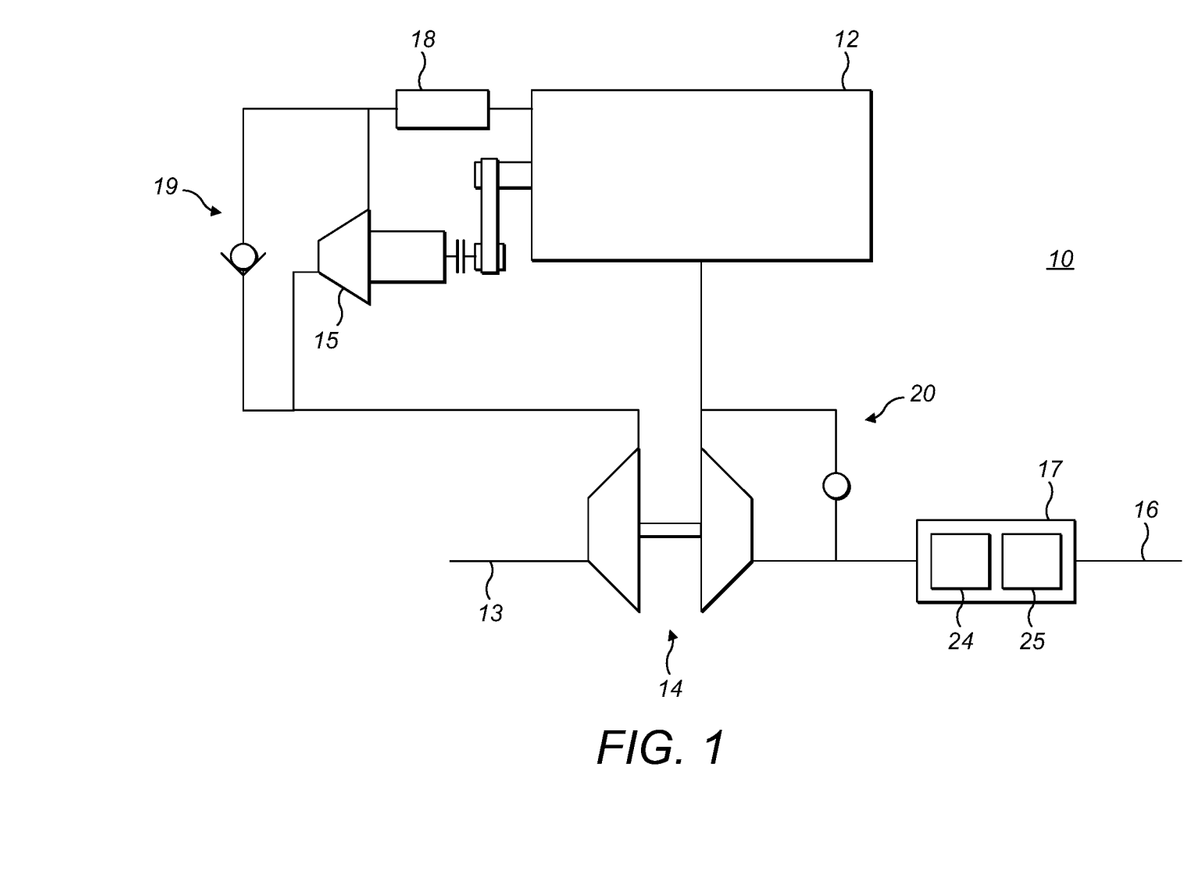
FIG. 1 is a schematic layout of an exemplary embodiment of an engine system in accordance with the present disclosure.

FIG. 1 illustrates an exemplary embodiment of an engine system 10 comprising the filter arrangement 11 of the present disclosure. The engine system 10 may be for providing power and/or drive to a machine. The machine may comprise a work machine or vehicle, such as an excavator, backhoe, articulated truck or the like.

The engine system 10 comprises an engine 12 receiving air for an air intake 13, such as via a turbocharger 14 and/or supercharger 15. The engine 12 may be an internal combustion engine, such as a compression-ignition or spark-ignition engine. Fuel, such as diesel, petrol or natural gas, may be selectively provided to engine cylinders in the engine 12 to combust with the intake air and drive the pistons, thereby rotating a crankshaft and providing an engine output torque and power. The by-product of the combustion process is exhaust gas, which may be directed from the engine 12 towards an exhaust 16 via an aftertreatment module 17 and optionally the turbocharger 14. The engine system 10 may comprise any other suitable component, such as a cooler 18 upstream of the engine 12, a supercharger bypass 19 and/or a turbine bypass 20.

The exhaust gas exiting the engine 12 may comprise unwanted gaseous emissions or pollutants, such as nitrogen oxides (NOx), particulate matter (such as soot), sulphur oxides, carbon monoxide, unburnt hydrocarbons and/or other organic compounds. The exhaust aftertreatment module 17 may receive and treat the exhaust gas to remove pollutants prior to directing the exhaust gas to atmosphere via the exhaust 16. The exhaust aftertreatment module 17 may comprise a selective catalytic reduction or SCR system 25 and may comprise a diesel oxidation catalyst 24. The diesel oxidation catalyst 24 may be arranged to receive exhaust gases from the engine 12 and may be located upstream of the SCR system 25.

Figure 2:
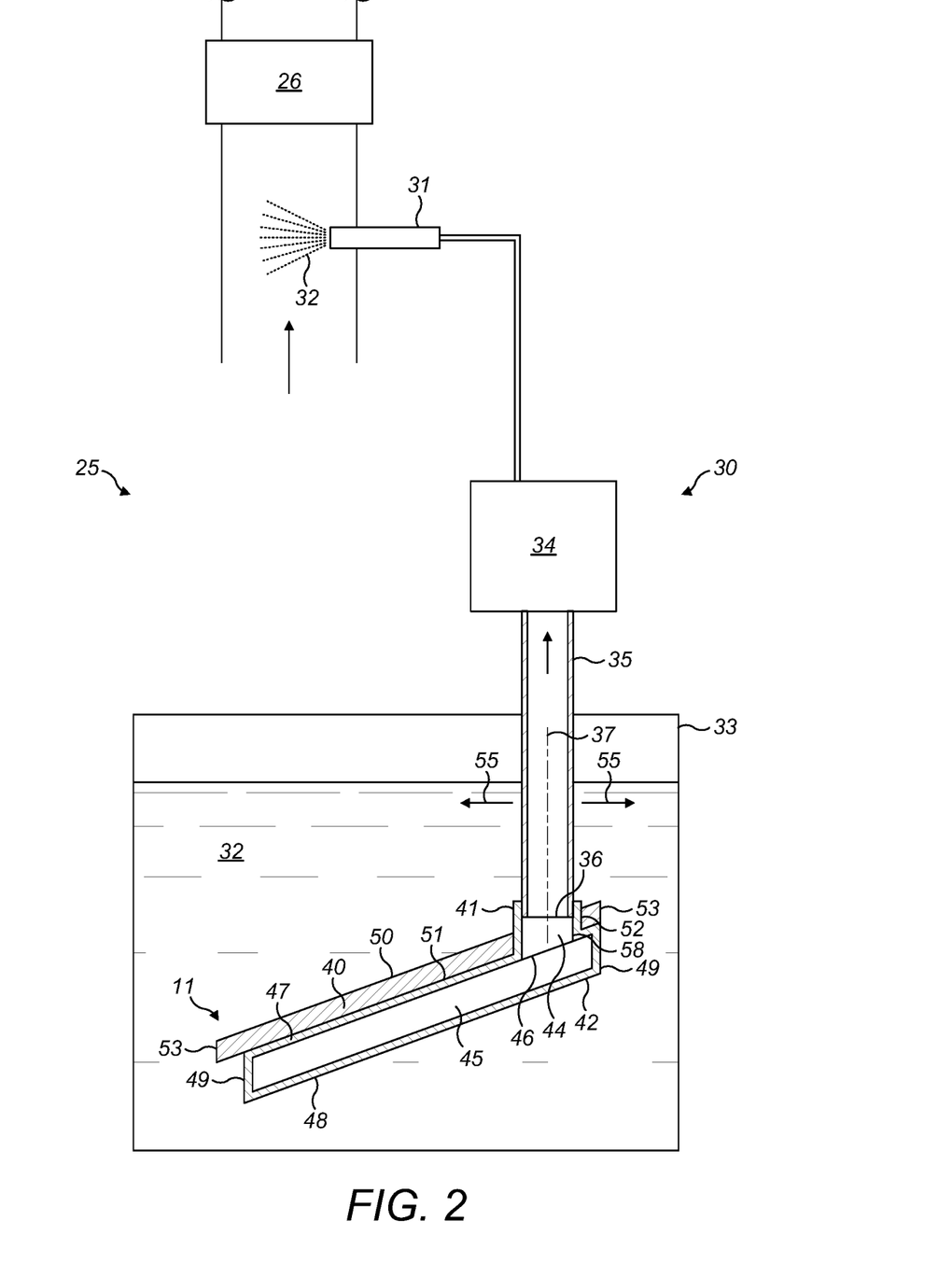
FIG. 2 is a schematic layout of a reductant supply system of the engine system of FIG. 1 and showing a filter arrangement of the present disclosure in a cross-sectional view.

The SCR system 25, which is illustrated schematically in FIG. 2, may comprise an SCR catalyst arrangement 26 and a reductant supply system 30. The reductant supply system 30 may comprise a reductant injector 31 for selectively injecting reductant liquid 32 into the exhaust gas directed from the engine 12, such as via the turbocharger 14 and/or diesel oxidation catalyst 24. The reductant injector 31 may inject reductant liquid 32 upstream of the SCR catalyst arrangement 26.

The reductant liquid 32 may comprise aqueous urea, aqueous ammonia or the like. The reductant liquid 32 may be diesel fluid (DEF) and the DEF may meet the ISO22241 standard and comprise from 31.8% to 33.2% urea by weight. The reductant injector 31 may selectively inject the reductant liquid 32 into the stream of exhaust gas to provide a dose of reductant liquid 32 to the SCR catalyst arrangement 26. The high exhaust gas temperature may cause the reductant liquid 32 to evaporate and the resulting combination of gases may contact a catalyst substrate in the SCR catalyst arrangement 26. The reductant liquid 32 may react with the NOx in the exhaust gas to reduce it to nitrogen and water, which may pass out of the engine system 10 via the exhaust 16.

The reductant supply system 30 comprises a tank 33 for storing reductant liquid 32 and a pump 34 in fluid communication with the tank 33 and the reductant injector 31. The pump 34 is configured to draw reductant liquid 32 from the tank 33 and direct the reductant liquid 32 to the reductant injector 31. The reductant supply system 30 comprises an outlet or suction tube 35 at least partially mounted in the tank 33 and in fluid communication with the pump 34. The suction tube 35 may extend from inside the tank 33 to the pump 34 as illustrated or further conduits and/or valves may be located between the tank 33 and pump 34.

The suction tube 35 comprises a tube inlet 36 for receiving reductant liquid 32 from the tank 33. The pump 34 may selectively draw reductant liquid 32 from the tank 33 through the tube inlet 36. The suction tube 35 may be configured to extend into the tank 33 such that the tube inlet 36 is below a predetermined level (for example, a minimum fill level below which the SCR system 25 is not operational) of reductant liquid 32 therein when the SCR system 25 is operational. The tube inlet 36 may be, in use, the lowest (i.e., lowest along the direction of gravity when the engine system 10 is level) point of suction of the suction tube 35 as the pump 34 operates.

The suction tube 35 may extend along a longitudinal axis 37 from a centre point of the tube inlet 36. In use, when the engine system 10 is in an upright position (such as when the machine it is mounted in is on level ground), the longitudinal axis 37 is coaxial with the direction of gravity. The suction tube 35 may be configured such that reductant liquid 32 may flow in a direction along the longitudinal axis 37 when passing in or out of the tube inlet 36.

The reductant supply system 30 further comprises the filter arrangement 11 mounted to the suction tube 35 and the filter arrangement 11 is configured to filter the reductant liquid 32 prior to being drawn into the suction tube 35 and out of the tank 33. The filter arrangement 11 of FIG. 2 is illustrated in further detail in FIG. 3. The filter arrangement 11 is mounted to the suction tube 35 so as to cover the tube inlet 36.

Figure 3:
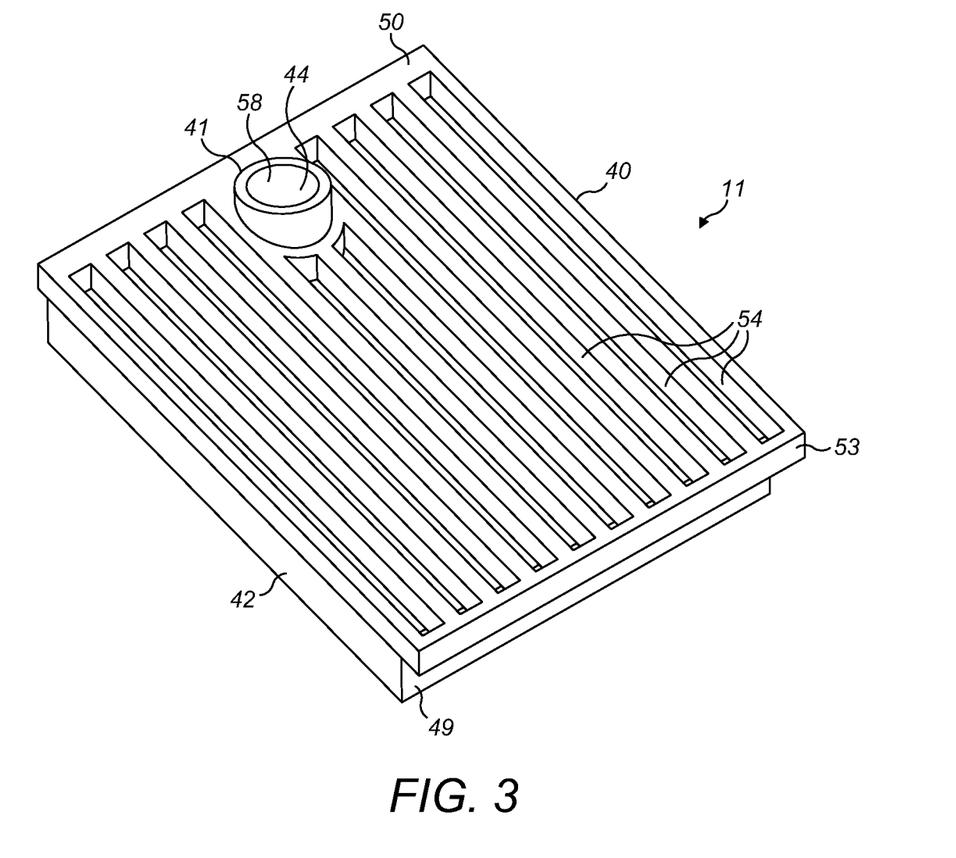
FIG. 3 is a perspective view of the filter arrangement of FIG. 2.

The filter arrangement 11 comprises a restraining body 40, a filter mount 41 mounting the filter arrangement 11 to the suction tube 35, a filter 42 mounted to the restraining body 40 and a filter outlet 44 formed through the restraining body 40 and/or filter 42.

The filter 42 is for filtering reductant liquid 32 drawn from the tank 33 into the filter arrangement 11 by the pump 34. Substantially all reductant liquid 32 drawn from the tank 33 and directed to the reductant injector 31 by the pump 34 may pass through the filter 42 prior to entry into the suction tube 35.

The filter 42 may be flexible, may comprise a flexible membrane, may comprise a filter fabric and/or may be more flexible than the restraining body 40. The filter 42 may be sufficiently flexible such that under the effects of the buoyancy of air therein, the filter 42 may be inclined to change in shape, although the restraining body 40 may substantially prevent such a change in shape. The filter 42 may comprise a 2D or 3D filter and/or a mesh filter and may comprise multiple layers of materials bound together for filtration of the reductant liquid 32.

The filter arrangement 11 comprises a filter chamber 45 formed at least partially by the filter 42 and, optionally, by the restraining body 40 and/or filter mount 41. Fluid communicated between the suction tube 35 and filter 42 may pass through the filter chamber 45. The reductant liquid 32 may pass through the filter chamber 45 after passing through the filter 42 and prior to passing through the suction tube 35 when the pump 34 draws reductant liquid 32 from the tank 33 to the reductant injector 31.

The filter chamber 45 may be formed within the filter 42 and the filter 42 may surround the filter chamber 45. The filter 42 may comprise at least one filter wall 47, 48, such as upper and lower filter walls 47, 48 as illustrated in FIG. 2, and the filter chamber 45 may be enclosed therebetween. The filter 42 may form a pouch or bag as illustrated in FIGS. 1 and 2 and may define the filter chamber 45 within the pouch.

The filter 42 may comprise or define a filter aperture 46 for liquid communication between the filter chamber 45 and the suction tube 35. The filter aperture 46 may extend through the upper filter wall 47 and may extend through the pouch. The filter aperture 46 may be configured to enable liquid communication between the filter chamber 45 and the suction tube 35.

The restraining body 40 extends radially outwardly from the filter mount 41 and the suction tube 35 between a proximal body side 50 and a distal body side 51. The term "radially outwardly" may refer to a radial direction 55 perpendicular to the direction of gravity, perpendicular to the longitudinal axis 37 of the suction tube 35 and/or perpendicular to the (main) direction of flow of liquid entering or exiting the suction tube 35 at the tube inlet 36.

The proximal body side 50 may extend from adjacent to the suction tube 35 and the proximal body side 50 of the restraining body 40 may be closest to the suction tube 35 compared to the distal body side 51. The distal body side 51 may be furthest from the suction tube 35 and may face away from the suction tube 35. In use, the distal body side 51 may face downwardly into the tank 33 and the proximal body side 50 may face upwardly towards the suction tube 35 and the top of the tank 33.

Figure 4:
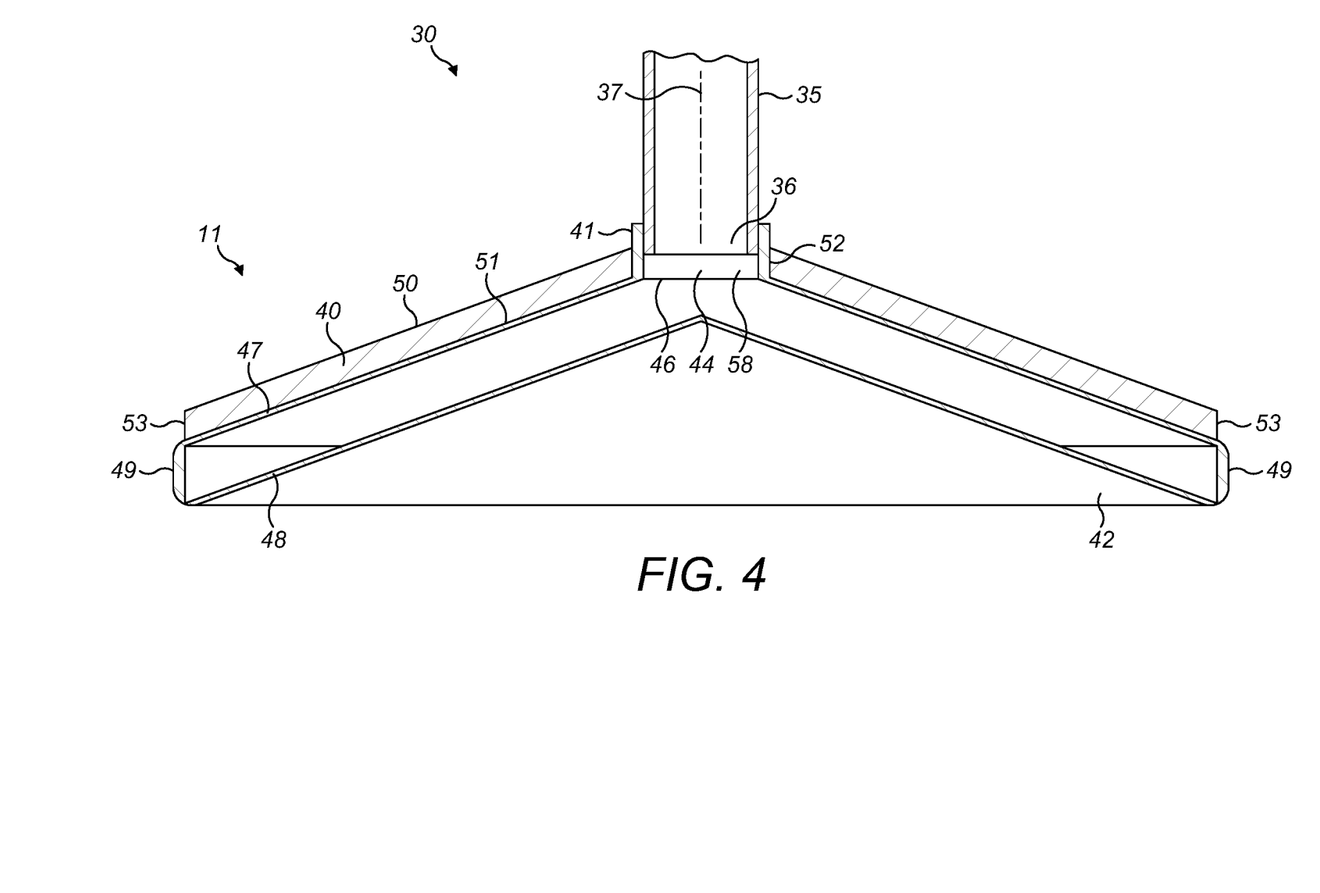
FIG. 4 is a cross-sectional view of a suction tube and a further embodiment of the filter arrangement of the present disclosure.
Figure 5:
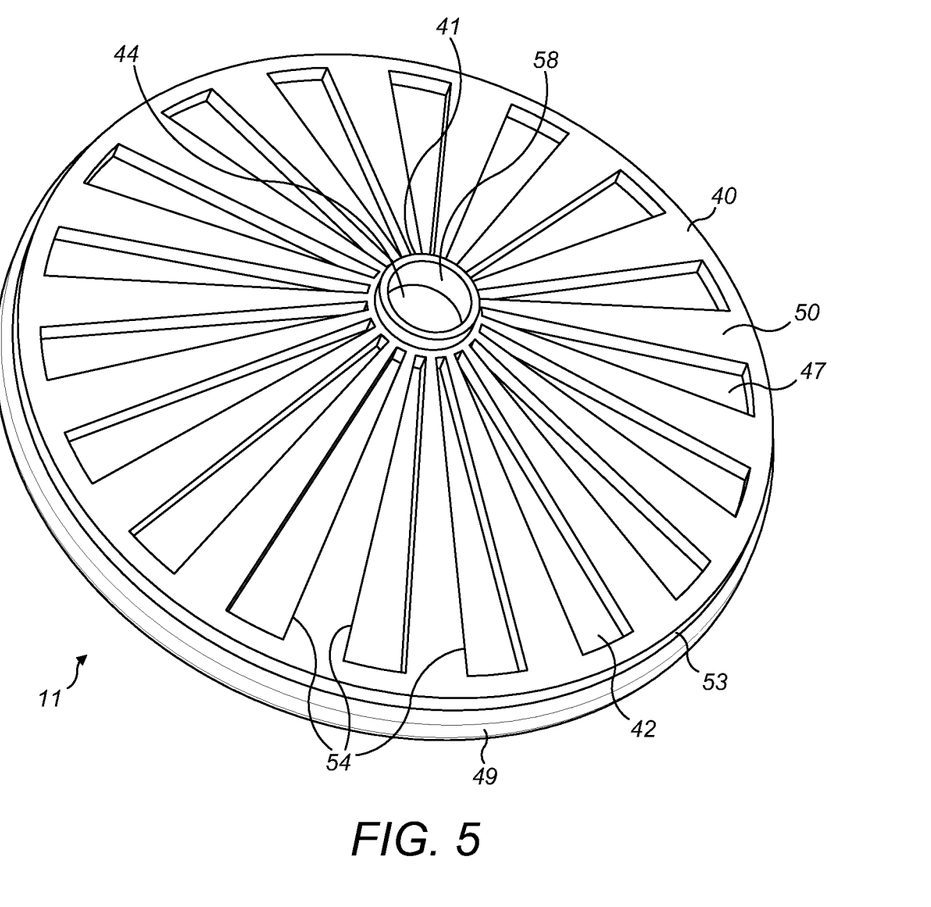
FIG. 5 is a perspective view of the filter arrangement of FIG. 4.

The restraining body 40 may extend from a body aperture 52 to an outer body edge 53 between the proximal and distal body sides 50, 51. The proximal and distal body sides 50, 51 may comprise any suitable shape, such as rectangular as illustrated in FIGS. 2 and 3 or conical as illustrated in FIGS. 4 and 5.

The restraining body 40 may comprise a plate and/or be thin walled. The maximum width of the restraining body 40, which may be the maximum diameter or dimension across the proximal and distal body sides 50, 51 within the outer body edge 53 and across the body aperture 52, may be substantially greater than the maximum thickness of the restraining body 40, which may be the dimension between the proximal and distal body sides 50, 51. In particular, the maximum width may be at least ten times greater than the maximum thickness.

The restraining body 40 may be rigid and may be substantially more rigid than the filter 42. The restraining body 40 may be configured to retain its shape regardless of its orientation and may be configured to restrain the shape of the filter 42, which may be more flexible than the restraining body 40. The restraining body 40 may comprise a metal or plastic.

The filter 42 may be attached or mounted to the restraining body 40. The filter 42 extends at least partially across the distal body side 51 and may be mounted adjacent to and/or to the distal body side 51. The filter 42 may be mounted on the other side 51 of the restraining body 40 to the suction tube 35. The at least one filter wall 47, 48 may be attached to the restraining body 40, such as to the distal body side 51, for example by adhesive. However, adhesive may not be necessary as air in the filter 42 may push it towards the restraining body 40 and the restraining body 40 may restrict the upward movement of the filter 42 due to buoyancy. The upper filter wall 47 may be mounted to and extend across the distal body side 51. The filter chamber 45 may separate the upper and lower filter walls 47, 48 from one another. The filter 42 may comprise an outer filter edge 49, which may form the outer perimeter of the filter 42 furthest from the filter aperture 46, tube inlet 36, filter mount 41 and/or body aperture 52.

The outer filter edge 49 may extend between the upper and lower filter walls 47, 48. Therefore, the filter chamber 45 may be enclosed within the upper and lower filter walls 47, 48 and the outer filter edge 49.

The restraining body 40 may extend radially outwardly to at least the entire outer perimeter of the filter 42. The restraining body 40 may extend over the entire filter 42 and the filter 42 may extend along the distal body side 51 no further than the outer body edge 53. The filter 42 may be mounted to the restraining body 40 such that the outer filter edge 49 does not extend beyond the outer body edge 53.

The restraining body 40 may comprise a mesh as illustrated in FIG. 3 and may comprise a plurality of mesh apertures 54 extending therethrough, such as between the proximal and distal body sides 50, 51. The mesh apertures 54 may be configured to allow fluid communication from the filter 42, such as through the upper filter wall 47, at the distal body side 51, through the restraining body 40 and beyond the proximal body side 50. In particular, the mesh apertures 54 may be configured to allow gas trapped in the filter 42 to escape from the filter 42 and through the restraining body 40 via the mesh apertures 54, such as under the effects of buoyancy.

The filter mount 41 is for mounting the filter arrangement 11 to the suction tube 35 such that (a) the filter chamber 45 is in fluid communication with the suction tube 35 via the filter outlet 44 and (b) the filter 42 is on the distal body side 51 of the restraining body 40 to the suction tube 35.

The filter mount 41 is mounted to the restraining body 40 and/or filter 42. The filter mount 41 may be formed from the restraining body 40 and/or the filter 42. As illustrated, the restraining body 40 may be mounted to the filter mount 41 at the body aperture 52, such as by the filter mount 41 being mounted in and/or around the body aperture 52. The filter mount 41 may be integrated with the restraining body 40 or the filter 42 or may be a separate component attached thereto.

The filter mount 41 may comprise a mount passageway 58 extending therethrough and the filter aperture 46 may be mounted over the mount passageway 60. The filter mount 41 may be mounted to the suction tube 35 such that the mount passageway 60 is in fluid communication with the tube inlet 36. Therefore, liquid may be drawn from the filter chamber 45, through the filter aperture 46 and into the suction tube 35, such as via the mount passageway 60 and tube inlet 36.

The filter mount 41 may comprise a fastener, such as a thread on the inside of the mount passageway 60, for fastening to a reciprocal fastener, such as a thread, of the suction tube 35. Alternatively, the filter mount 41 may be mounted onto the suction tube 35 by a push-fit connection.

The filter outlet 44 extends from the filter chamber 45 and is formed through the restraining body 40 and/or filter 42. The filter outlet 44 may also extend through the filter mount 41. Therefore, the filter outlet 44 may comprise the filter aperture 46, the body aperture 52 and/or the mount passageway 58, which may be aligned with each other as illustrated. Reductant liquid may communicate between the filter chamber 45 and the suction tube 35 through the filter outlet 44. The filter outlet 44 may be configured to direct liquid along the longitudinal axis 37 between the filter chamber 45 and the suction tube 35.

The restraining body 40 extends radially outwardly from the filter mount 41 and is configured to restrain the filter 42 such that, under the effect of buoyancy in the tank 33 in use, gas in the filter chamber 45 is directed towards the filter outlet 44. Such buoyancy arises due to the filter 42 being immersed in reductant liquid 32 in the tank 33.

In order to direct gas towards the filter outlet 44, the restraining body 40 may depend downwardly from the suction tube 35 and/or the restraining body 40 may extend radially outwardly at an acute angle to the longitudinal axis 37 away from the filter outlet 44. Thus the restraining body 40 may extend at an acute angle to the suction tube 35. As a result, in use the entire filter chamber 45 is located below the filter outlet 44 and the tube inlet 36 and gas travels up the filter chamber 45 and into the filter outlet 44.

Various alternative embodiments fall with the scope of the present disclosure. FIGS. 4 and 5 illustrate a further embodiment of the filter arrangement 11 in which the restraining body 40 comprises a thin-walled cone, which may be truncated as shown at the filter outlet 44. Gas in the filter 42 may flow upwardly under buoyancy in the filter chamber 45 towards the centre of the cone to exit through the filter outlet 44, which is located at the tip of the cone. The term "thin-walled" refers to the distance between the proximal and distal body sides 50, 51 which may be less, such as at least ten times less, than the diameter or distance across the restraining body 40 within the outer body edge 53. The filter arrangement 11 may therefore be rotationally symmetric about the filter outlet 44. In this embodiment the filter 42 may comprise a pouch as illustrated entirely enclosing the filter chamber 45 other than at the filter outlet 44. The filter may also be shaped as a substantially thin-walled hollow cone as illustrated.

Furthermore, the restraining body 40 may be solid and may not comprise mesh apertures 54 such that gas cannot escape therethrough. In such an arrangement the filter 42 may not comprise an upper filter wall 47 extending across the distal body side 51. Instead, a filter wall may be attached at or adjacent to the outer body edge 53 and extend across the distal body side 51. The filter chamber 45 may be formed between filter wall and the distal body side 51.

In further embodiments the filter mount 41 may be integrated with the suction tube 35 and the reductant supply system 30 may comprise the restraining body 40, the filter mount 41 and the suction tube 35 as a unitary component.

INDUSTRIAL APPLICABILITY

In use the pump 34 is operated to draw reductant liquid 32 from the tank 33, through the filter 42 into the filter chamber 45, from the filter chamber 45 through the filter outlet 44, through the suction tube 35 and to the reductant injector 31. Reductant liquid 32 may thus be selectively injected into the exhaust gas stream by the reductant injector 31.

At the end of an operating cycle a purge process may be run in which the pump 34 is operated to draw any reductant liquid 32 back from the reductant injector 31 and into the tank 33. However, in such a process air may also be drawn into the tank 33. Due to the construction of the filter 42, much of the gas may be maintained within the filter chamber 45.

It has been identified that a particular cause for air to remain in flexible filters 42 after a purge process is that, by virtue of the buoyancy of the air in the flexible filters 42, the filters 42 may be inclined to balloon upwardly around the tube inlet 36. This prevents the air from exiting the filter 42 and the air may subsequently cause a failure in priming or aeration of the reductant liquid 32.

The present disclosure therefore overcomes such issues by the restraining body 40 restricting the filter 42 from rising above the tube inlet 36. The restraining body 40 therefore ensures that the whole of the filter 42 is always below the tube inlet 36 and any air therein moves towards and through the tube inlet 36 after the purge is completed. During or after priming, in which the pump 34 draw reductant liquid 32 from the tank 33 towards the reductant injector 31, there is then no stored air in the filter that can be released, such as due to machine vibration. Any air in the reductant supply system 30 will be quickly driven therefore.

Furthermore, if the filter arrangement comprises mesh apertures 54, any gas within the filter chamber 45 may also be able to exit through the upper filter wall 47 and the mesh apertures 54.

What is claimed is:

1. A filter arrangement for a reductant supply system of a selective catalytic reduction system, the reductant supply system comprising a tank and a suction tube mounted at least partially in the tank for receiving reductant liquid from the tank, wherein the filter arrangement comprises:
   a restraining body comprising a distal body side;
   a filter extending at least partially across the distal body side of the restraining body and at least partially forming a filter chamber;
   a filter outlet from the filter chamber formed through the restraining body and/or filter; and
   a filter mount mounted to the restraining body and/or filter, wherein the filter mount is for mounting the filter arrangement to the suction tube such that (a) the filter chamber is in fluid communication with the suction tube via the filter outlet and (b) the filter is on the distal body side of the restraining body to the suction tube,
   wherein the restraining body extends radially outwardly from the filter mount and is configured to restrain the filter such that, under the effect of buoyancy in the tank in use, gas in the filter chamber is directed towards the filter outlet.

2. The filter arrangement as claimed in claim 1 wherein the restraining body extends radially outwardly to at least the entire outer perimeter of the filter.

3. The filter arrangement as claimed in claim 1 wherein the filter outlet is configured to direct liquid along a longitudinal axis between the filter chamber and the suction tube and the restraining body extends radially outwardly at an acute angle to the longitudinal axis away from the filter outlet.

4. The filter arrangement as claimed in any claim 1 wherein the restraining body is more rigid than the filter.

5. The filter arrangement as claimed in claim 1 wherein the restraining body comprises a plate or a thin-walled cone.

6. The filter arrangement as claimed in claim 1 wherein the restraining body extends across a width between a proximal body side and the distal body side, wherein a thickness between the proximal and distal body sides is smaller than the width.

7. The filter arrangement as claimed in claim 1 wherein the filter comprises a flexible membrane and/or filter fabric.

8. The filter arrangement as claimed in claim 1 wherein the filter comprises at least one filter wall and the filter chamber is enclosed within the at least one filter wall.

9. The filter arrangement as claimed in claim 1 wherein the filter comprises an upper filter wall attached to and extending at least partially across the distal body side.

10. The filter arrangement as claimed in claim 1 wherein the restraining body comprises a plurality of mesh apertures extending therethrough and configured for fluid communication from the filter through the restraining body.

11. The filter arrangement as claimed in claim 1 wherein the filter mount is integrated with the filter and/or the restraining body.

12. The filter arrangement as claimed in claim 1 wherein the filter comprises a filter aperture therethrough, the restraining body comprises a body aperture therethrough and/or the filter mount comprises a mount passageway therethrough, wherein the filter outlet comprises the filter aperture, the body aperture and/or the mount passageway.

13. A reductant supply system for a selective catalytic reduction system, the reductant supply system comprising:
- a tank for holding reductant liquid;
- a suction tube mounted at least partially in the tank for receiving reductant liquid from the tank; and
- a filter arrangement mounted to the suction tube, the filter arrangement comprising:
  - a restraining body comprising a distal body side;
  - a filter extending at least partially across the distal body side of the restraining body and at least partially forming a filter chamber;
  - a filter outlet from the filter chamber formed through the restraining body and/or filter; and
  - a filter mount mounted to the restraining body and/or filter such that (a) the filter chamber is in fluid communication with the suction tube via the filter outlet and (b) the filter is on the distal body side of the restraining body to the suction tube,
- wherein the restraining body extends radially outwardly from the filter mount and suction tube and is configured to restrain the filter such that, under the effect of buoyancy in the tank in use, gas in the filter chamber is directed towards the filter outlet.

14. The reductant supply system of claim 12 wherein the suction tube extends along a longitudinal axis and the restraining body extends radially outwardly at an acute angle to the longitudinal axis.

15. An engine system comprising an exhaust aftertreatment module for receiving exhaust gas from an internal combustion engine, the exhaust aftertreatment module comprising a selective catalytic reduction system, the selective catalytic reduction system comprising a reductant supply system, the reductant supply system comprising:
- a tank for holding reductant liquid;
- a suction tube mounted at least partially in the tank for receiving reductant liquid from the tank; and
- a filter arrangement mounted to the suction tube, the filter arrangement comprising:
  - a restraining body comprising a distal body side;
  - a filter extending at least partially across the distal body side of the restraining body and at least partially forming a filter chamber;
  - a filter outlet from the filter chamber formed through the restraining body and/or filter; and
  - a filter mount mounted to the restraining body and/or filter such that (a) the filter chamber is in fluid communication with the suction tube via the filter outlet and (b) the filter is on the distal body side of the restraining body to the suction tube,
- wherein the restraining body extends radially outwardly from the filter mount and suction tube and is configured to restrain the filter such that, under the effect of buoyancy in the tank in use, gas in the filter chamber is directed towards the filter outlet.

* * * * *